Nov. 25, 1930.  L. ROSENFELD  1,783,100
MILK COOLER
Filed Feb. 15, 1929   2 Sheets-Sheet 1

Inventor
Louis Rosenfeld
By Robert Watom
Attorney

Nov. 25, 1930.  L. ROSENFELD  1,783,100
MILK COOLER
Filed Feb. 15, 1929   2 Sheets-Sheet 2
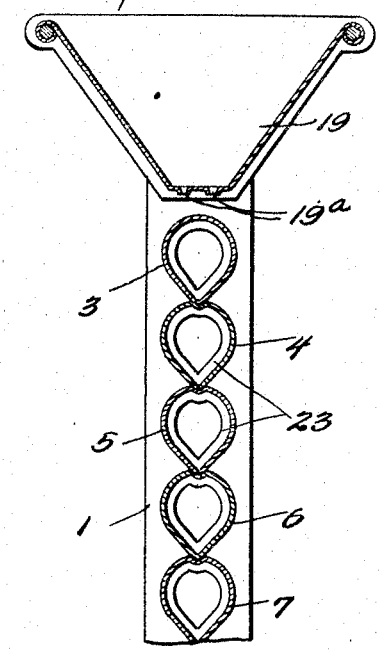
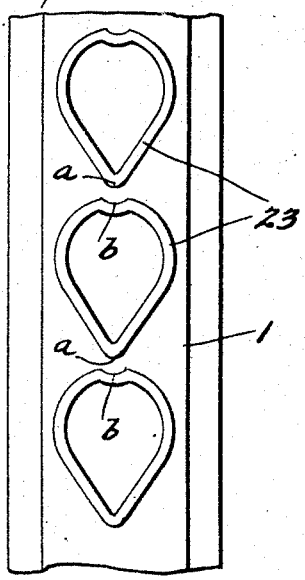
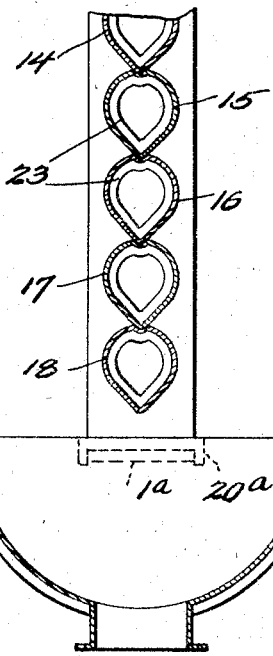
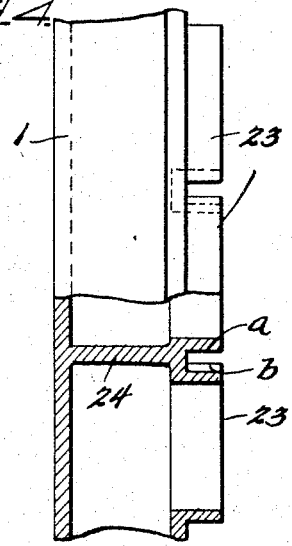
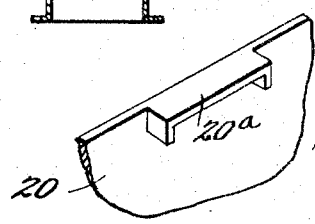
Inventor
Louis Rosenfeld
By Robert Watson
Attorney Patented Nov. 25, 1930

1,783,100

UNITED STATES PATENT OFFICE

LOUIS ROSENFELD, OF BALTIMORE, MARYLAND, ASSIGNOR TO CHERRY-BURRELL CORPORATION, OF CHICAGO, ILLINOIS, A CORPORATION OF DELAWARE

MILK COOLER

Application filed February 15, 1929. Serial No. 340,209.

This invention relates to milk coolers of the type comprising a pair of vertically arranged headers with tubes for cooling liquid arranged one above the other and connected in series by the headers. More particularly, the invention relates to the form and arrangement of the tubes whereby the milk will flow over the tubes directly from one tube to the next, without dripping, and will spread evenly over the tubes. The invention relates also to certain details of construction which will be hereinafter set forth.

In the accompanying drawing,

Fig. 2 is a section on the line 2—2 of Fig. 2, partly broken away;

Fig. 3 is a detail view showing part of the inner face of one of the headers, on an enlarged scale, the tubes being omitted;

Fig. 4 is an edge view of the same partly in section, looking from left to right in Fig. 3; and, Fig. 5 is a detail view showing part of one end of the drip pan.

Figure 1:
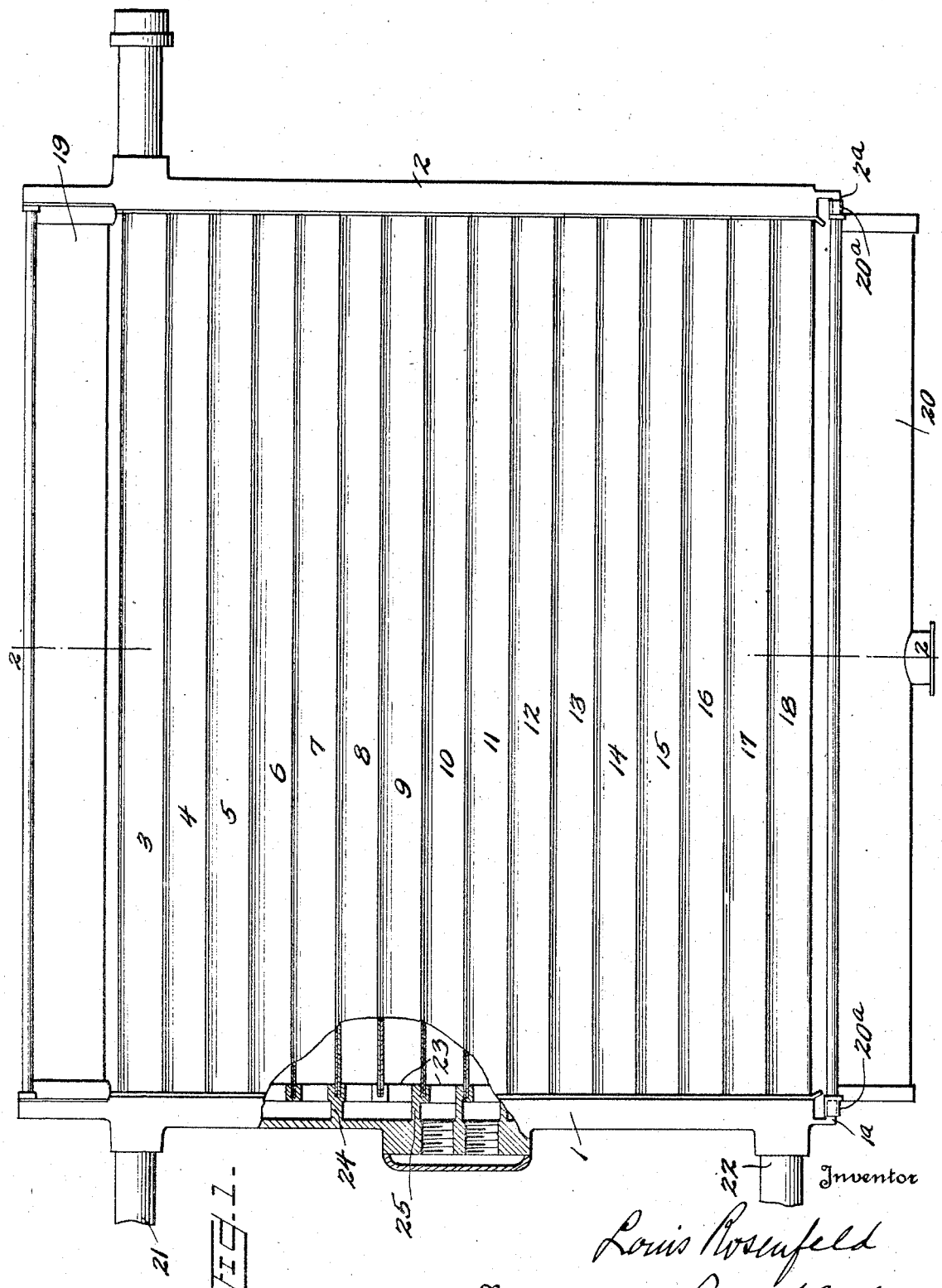
Fig. 1 is a side elevation of the cooler, partly in section.

Referring to the drawing, the cooler comprises a pair of upright hollow headers 1 and 2, connected together by a vertical series of tubes, 3–18, inclusive. Above the uppermost tube 3 is arranged a trough 19, into which the milk to be cooled is poured, and below the lowermost tube 18 is arranged a drip pan 20, adapted to receive the milk as it drips from the lowermost tube. The header 1 is provided with an inlet opening 21, to which a pipe may be connected for conveying the cooling liquid to the cooler, and it is also provided with an outlet opening 22, from which the cooling liquid may escape into a discharge pipe. The headers, on their adjacent faces, are provided with tubular bosses 23, which are heart-shaped in end view or cross section, and the tubes 3, 4, 5, etc. are likewise heart-shaped in cross section and the ends of the tubes fit around these bosses and are soldered thereto, so as to make liquid-tight joints with the headers. As shown in Fig. 3, the apex $a$ of each boss is directly above the recess $b$ in the next lower boss, and the bosses are spaced apart a sufficient distance to permit the tubes 3, 4, 5, etc. to be placed upon them. When the tubes are assembled on the bosses, the apex of each tube in the series (except the lowermost tube) will fit into the recess in the tube next below it, so that the tubes will contact with one another throughout their lengths. Within the headers are arranged partitions, such as 24 and 25, which divide the headers into compartments for directing the cooling liquid through the tubes in series from the inlet opening to the outlet opening.

The trough 19 is provided with perforations 19ª, to permit the milk to drip on to the uppermost tube throughout its length. The milk flows downwardly on both sides of the uppermost tube 3, and is delivered to the next tube 4 along its upper central line, and then passes over the sides of the several tubes, in succession, without dripping, and finally drips from the lowermost tube 18 into the drip pan.

The lower ends of the headers are formed with inwardly projecting flanges 1ª, and 2ª, and the ends of the drip pan are provided with outwardly projecting flanges 20ª, adapted to fit over the flanges on the headers. With this arrangement, any moisture condensing on the headers will flow to the flanges 1ª and 2ª, but will not flow over the flanges 20ª into the drip pan.

What I claim is:

A milk cooler comprising opposed upright hollow headers, each having a vertical series of tubular bosses heart-shaped in cross section and tubes, heart-shaped in cross section, extending between the headers and having their ends, fitting around the bosses, the apex of each tube fitting into the recess in the tube next below it, the headers having partitions therein for causing the cooling fluid to flow through the tubes in succession.

In testimony whereof I affix my signature.

LOUIS ROSENFELD.